Patented June 2, 1942

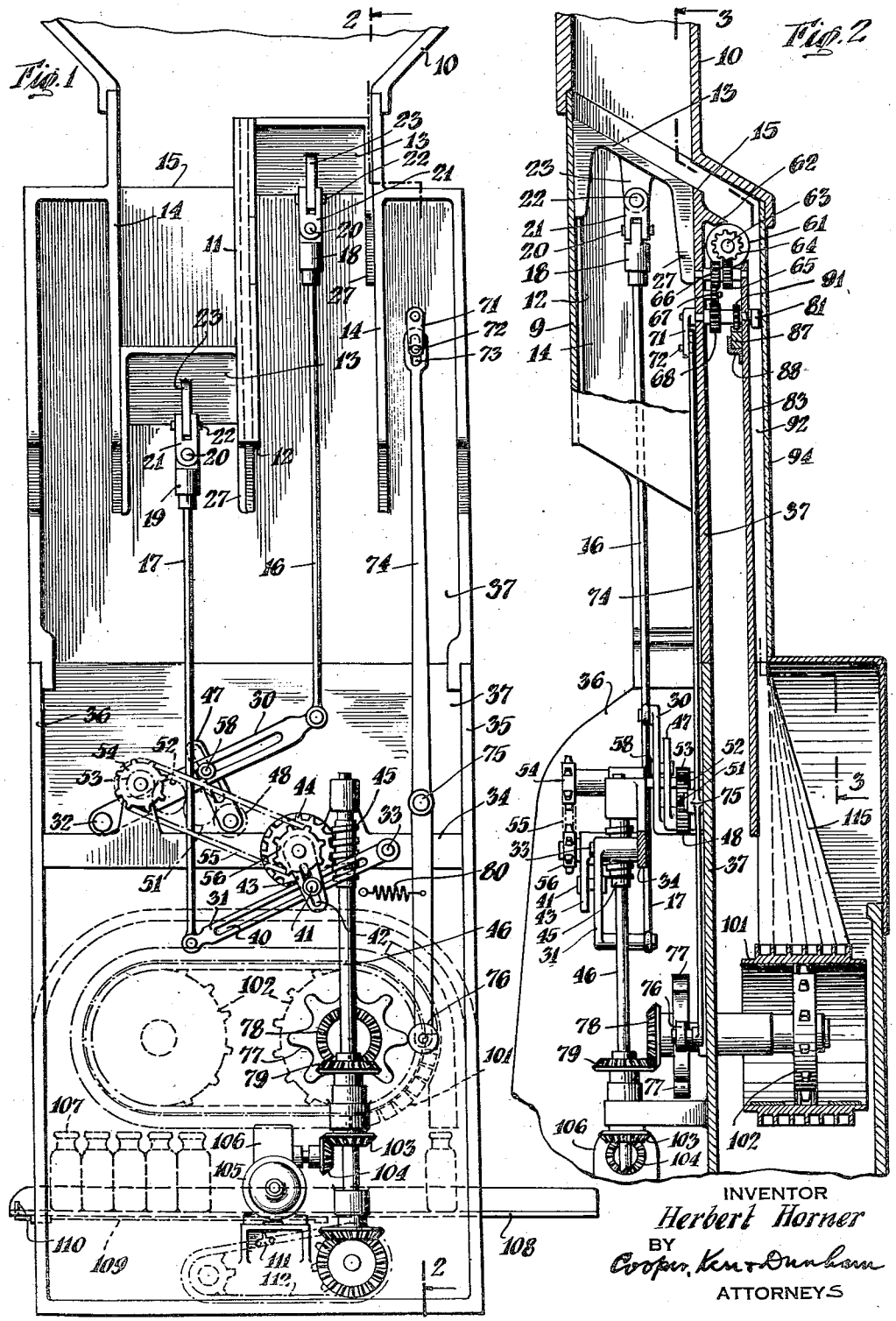

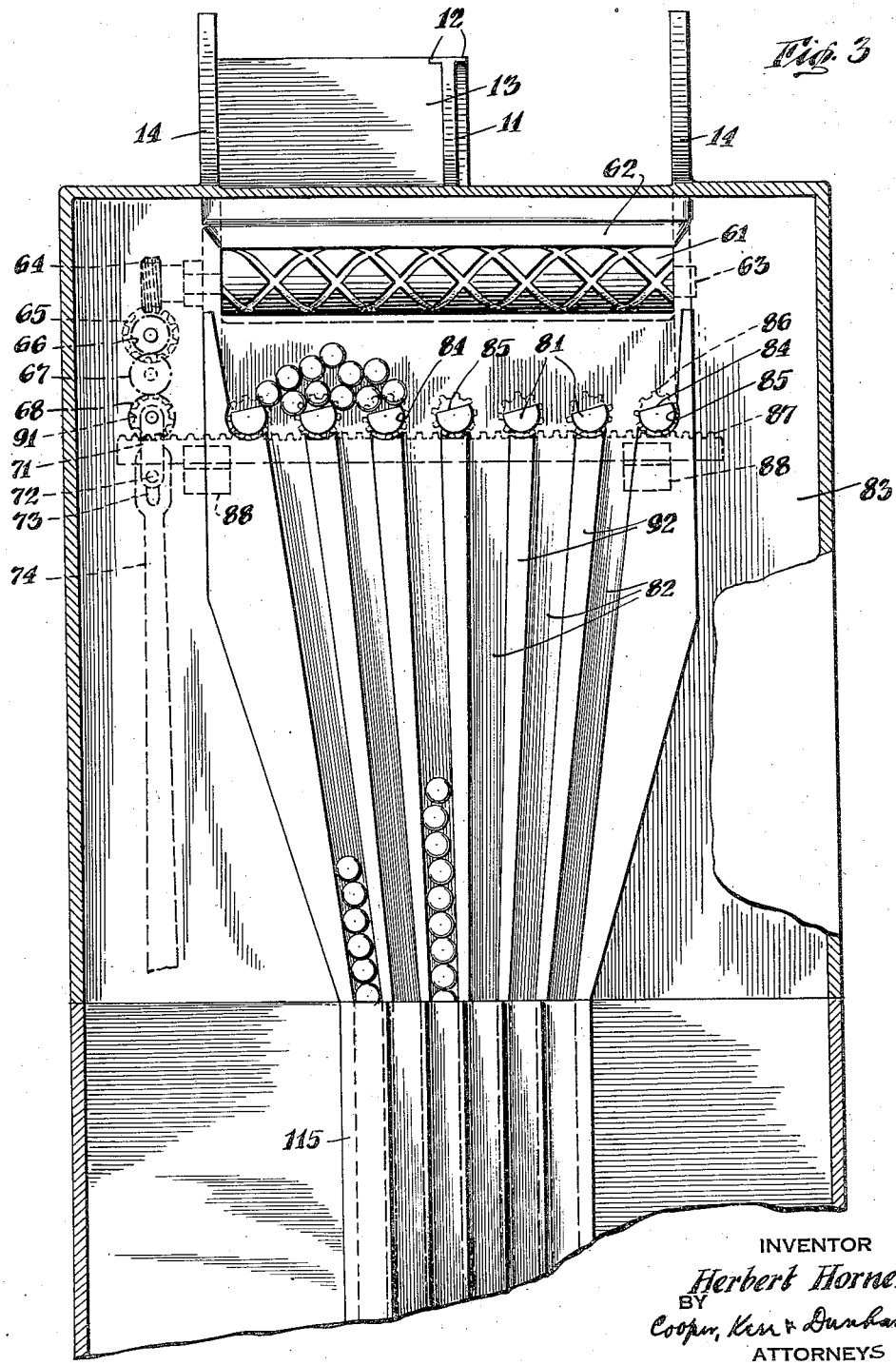

2,284,975

UNITED STATES PATENT OFFICE 2,284,975

ARTICLE DELIVERY MECHANISM

Herbert Horner, Woodhaven, N. Y.

Application September 29, 1938, Serial No. 232,261

14 Claims. (Cl. 221—142)

This invention relates generally to packaging machines and has particular reference to mechanisms for feeding tablets and other substantially flat articles from a supply source in which the articles are indiscriminately arranged and depositing them in containers. The inventions disclosed herein are improvements upon the inventions disclosed in application Serial No. 201,671, filed April 13, 1938, by the present applicant. The apparatus of the present invention is adapted to handle fragile or coated articles without fracturing them or damaging the finish and will, nevertheless, orient and feed such articles at a high speed. The apparatus disclosed in the drawings has fed, counted and deposited fragile tablets in containers at a rate exceeding 4500 per minute.

More specifically the invention provides, among other things, a hopper mechanism and related mechanism which will receive a supply of articles and feed them from the hopper toward delivery chutes and the like with a minimum of tumbling and handling in orienting them so that they will pass through the chutes in the desired positions. However, the hopper mechanism alone can be used without the related mechanism shown and described to deliver articles of any desired shape, size or character when it is advantageous to feed articles out of the hopper with a minimum of tumbling or friction liable to mar or break the articles.

Other and incidental objects are to provide a mechanism which is simple in construction and durable in operation and which can readily be adapted to increase or decrease the feeding capacity according to the requirements of the user.

With the foregoing and other objects in view, the invention consists in a novel construction and relative arrangement of parts, embodiments of which are illustrated in the accompanying drawings and hereinafter described, and the novel features of which are pointed out in the claims appended hereto.

In said drawings:

Fig. 1 is a rear view of the apparatus with a part of an excess supply hopper shown at the top of the figure. In this figure the rear cover 9 (Fig. 2) of the hopper mechanism is omitted.

Fig. 2 is a view along the line 2—2 of Fig. 1 looking in the direction of the arrows.

Fig. 3 is a front view on the line 3—3 of Fig. 2 looking in the direction of the arrows, with the parts shown on a larger scale than in Fig. 2.

The embodiment illustrated in the drawings comprises an excess supply hopper 10 in which tablets and similar articles may be deposited. This hopper may be of any size or height but it is preferred to have it of just sufficient capacity to insure a constant supply without having a weighted mass of articles which might, because of the weight, crush or otherwise damage the articles.

The bottom of the hopper is made in two sections which are really parts of the hopper, but are sometimes referred to in the following description and some of the claims as pockets extending from the hopper. Any desired number of these sections or pockets can be used, although only two are illustrated in the drawings. Extending across from front to back of the bottom of the supply hopper 10 is a plate 11 which is constructed to provide guides 12 for members 13 which are slidably supported and guided at their other sides by plates 14 forming continuations or extensions of the side walls of the supply hopper 10. These members 13 are moved up and down first to receive a supply of articles in the hopper extension or pocket from a supply above the members and are then raised to feed the articles over the forward edges 15 of the pockets. The latter effect is facilitated by having the upper surfaces of the members 13 inclined at an angle substantially as shown, which will direct the articles toward and over the edge 15.

In the preferred form of the mechanism the members 13 operate alternately, that is to say, one of the members is lowered to fill the pocket above it while the other member is being raised to deliver the articles over the top 15 of the pocket. It is also further preferred to have the lowering movement effected rapidly as compared with the upward movement so that the filling of the pocket and the start of the feeding from the pocket will be effected in much less time than the upward movement of the member 13 thereby contributing toward continuity of feed.

The mechanism for raising and lowering the members 13 to fill pockets and effect the delivery therefrom comprises links 16 and 17 provided at their upper ends with heads 18 and 19 having reduced portions pivoted at 20 between jaws in members 21, which are in turn pivoted at 22 to bosses or lugs 23 on the lower portions of the members 13, this double pivoting being to provide a connection somewhat in the nature of a universal joint. When the links 16 and 17 are reciprocated as hereinafter described, the members 13 will be raised and lowered, their movements being guided by extensions 27 on the members cooperating with the adjacent guides and walls previously described.

The mechanism for reciprocating the links comprises two arms 30 and 31 pivoted respectively at 32 and 33. The pivot 33 is on a cross member 34 extending between the walls 35 and 36 while the pivot 32 is on a plate 37 which serves both as the front wall for the hopper pockets and as a support for most of the mechanism.

The member 31 is provided with a slot 40 which is engaged by a member 41 which also extends through a slot 42 in an arm 43 rigid with a worm gear 44 meshing with the worm 45 on a driven shaft 46. The member 41, as shown in Fig. 2, is headed at both ends and forms a sliding connection operating in the slots 31 and 42. Rotation of the shaft 46 will cause the arm 43 to turn clockwise as viewed in Fig. 1 and act through the connection 41 to rock the arm 31 to raise and lower the link 17. In Fig. 1 the member 13 connected to the link 17 is shown in substantially its lowermost position. As the arm 43 turns clockwise from the position in which it is shown in Fig. 1, the connecting member 41 between the arm 43 and member 31 will gradually increase its distance from the pivot 33 so that there will be a comparatively slow movement of the member 31 and link 17 until the arm 43 is about diametrically opposite the position in which it is shown in Fig. 1, after which the member 41 will be moved nearer the pivot 33 causing a much more rapid downward movement of the member 31 and link 17. In the actual construction the link 17 and the connecting member 13 are drawn downward in less than one-fourth of the time that it takes for the upward movement of the member 13. This relation of descent and the ascent of the member 13 may, of course, be varied by making the necessary changes in the lengths and relations of the operating parts.

The link 16 is similarly raised and lowered by actuating the arm 30 from an arm 47 which is rigid with a small gear 48 journaled on the mounting plate 37 previously mentioned. The arm 47 is driven counterclockwise, as viewed in Fig. 1 by intermediate gears 51 and 52 rotatably mounted on the plate 37 and driven by a gear 53. Rigid with the gear 53 is a sprocket gear 54 connected by a driving chain 55 to a sprocket wheel 56 which is rigid with the driven gear 44. By this chain and gear connection the arms 43 and 47 will be driven in synchronism but in opposite directions.

During the swinging of the arm 47 around its axis, a connecting member 58, like the member 41, will slide along the slots in the members 30 and 47 and the speed of movement imparted to the arm 30 and connected parts will depend upon the distance of the connecting member 58 from the pivot 32. In turning from the position in which it is shown in Fig. 1 the member 47 will carry the connecting member 58 toward the pivot 32 and cause a quick lowering of the link 16 and its connected member or hopper bottom 13 from the position in which it is shown in Fig. 1. By this time the arm 43 will have turned to a position in which the link 17 and connecting member 13 are moving upward so that a constant feed of tablets and similar articles over the edges 15 of the pockets or sections of the hopper will be maintained. In using the apparatus it is intended to have enough of the articles in the excess supply hopper 10 to more than fill the pocket which is being cleared by lowering its bottom 13 and still allow articles to flow direct from the excess supply over the edge 15. The delivery from the pocket which is being raised is, however, fast enough to keep a supply of articles passing over the associated edge of the pocket which is sufficient to keep all of the delivery chutes filled.

It is apparent that the form of connection between the members 13 and the driving shaft 46 is such that there is no sudden reversal of movement of the members 13, thereby preventing shock and contributing to long life of the parts. It is also apparent that after one of the pockets or hopper sections is filled the tablets or other articles are not tumbled or disturbed, thereby minimizing breakage or marring of the articles being fed.

As so far described, the mechanism is complete and satisfactory, and it obviously is capable of many uses other than such as are herein specifically mentioned. However, because of the high speed desired and accomplished in the particular machine illustrated, additional mechanism is employed for orienting or positioning tablets and other flat articles so as to prevent any accidental interruption of the feed. This mechanism comprises a roller 61, Figs. 2 and 3, which is mounted between the side plates of the apparatus in such a way as to have its periphery forming a continuation of the upper surface of a guiding member 62 upon which the articles drop after they pass over the forward edges 15 of the hopper sections or pockets. The roller may be provided with any form of grooves or projections depending upon the kind of article which is being handled by the apparatus. In the present embodiment the roller is provided with intersecting helical grooves which, when the roller is actuated, will engage and turn any tablets or similar shaped articles which are not flat against the slide or guide 62 so that the flat sides of the articles will be brought against the roller before they lose contact with the roller.

The roller may be actuated or driven in any suitable manner but in the present construction it is preferred to give the roller an oscillating or rocking movement. For this purpose the shaft 63 to which the roller 61 is attached, is provided with a worm gear 64 meshing with a worm gear 65 which is rigid with another gear 66. Meshing with the gear 66 is an intermediate gear 67 which in turn meshes with a gear 68. The shaft to which the gear 68 is attached extends through the mounting plate 37 and at its rear side is provided with an arm 71 carrying a pin and roller 72 extending into a slot 73 in the upper end of a long lever 74. This arm is pivoted at 75, Fig. 2, and carries at its lower end a roller 76 cooperating with a modified star wheel 77 which is rigid with a bevelled gear 78 meshing with a bevelled gear 79 attached to the driven shaft 46 previously referred to. A spring 80 holds the roller 76 against the star wheel and when the star wheel rotates the lever 74 is oscillated on its pivot 75 thereby effecting a like movement of the arm 71 which is transmitted to the gearing previously described to the roller 61. This oscillation of the lever 74 and connecting mechanism will occur a number of times during each rotation of the shaft 46, thereby causing a rapid oscillation of the roller 61. During these oscillations the counterclockwise (Fig. 2) movement of the roller 61 will have a tendency to lift tablets in contact therewith and the helical grooves in the roller 61 will tilt any of the flat articles which may be resting edgewise upon the roller until the flat sides of the articles are in contact with the roller.

Here again the mechanism as so far described is a reliable one and will feed and deliver articles at a high speed. However, articles of a certain size may form a block or bridge as illustrated at the left hand part of Fig. 3 and as an additional safeguard means is provided for preventing any such stoppage. This means includes a series of members 81 which are so positioned that one of them is at each side of delivery chutes 82. These members are journalled in a plate 83 which forms a back wall or support for the chutes 82. On the forward side each of the members has a circular portion 84 and a flat side 85 for engagement with or by the articles being handled. Rigid with each of the members 81 is a small pinion or gear 86 on the back of the plate 83, these pinions or gears all meshing with a rack 87 slidably supported in guides 88. Also meshing with the rack 87 is a small pinion or gear 91 which is rigid with the gear 68. As previously stated, the gear 68 is rigid with the arm 71. It is apparent that when the arm 71 is oscillated by the lever 74 as previously described, the rack 87 will be given a rapid reciprocating movement causing an oscillation of each of the members 81. During this oscillation the flat sides 85 on the members 81 will be turned counterclockwise from the positions in which they are shown in Fig. 3, and then back to those positions so that the articles above the members will be agitated and any bridging effect overcome so that the feed into the chutes 82 will not be interrupted. In addition to the agitation of the articles the flat sides will, at one limit of the oscillation, have the effect of widening the entrances to the chutes, thereby further insuring continuous delivery.

The delivery chutes 83 may have side walls or dividing plates of any desired construction. In the form shown the chutes are formed by members 92 attached to the plate 83 and so constructed as to cause the chutes to converge toward the bottom. That is to say, the chutes are wider at the top than at the bottom, but they should never be so wide at the top as to permit blocking or bridging of the articles. The chutes are covered by a plate 94 which is preferably transparent for obvious reasons.

In the embodiment shown in the drawings, the apparatus thus far described is used in connection with apparatus for counting tablets and depositing them in containers. The counting mechanism in the form shown is of the modified conveyor belt type such as is illustrated in application Serial No. 201,671, previously referred to, although the drum type of counter also shown in that application may also be employed.

The conveyor counter, designated by the numeral 101, is across what might be termed the front of the machine, and is driven by mechanism including sprockets 102, one of which is attached to the shaft carrying the bevel gear 78. The shaft 46 and the bevel gear 79, meshing with the gear 78, are driven by bevelled gears 103 and 104 forming part of a driving connection with a motor and reduction gear box shown conventionally at 105 and 106. The containers 107 are moved along guides 108 by reciprocating members 109 carrying lugs 110 for engaging the containers. The members 109 are reciprocated against springs (not shown) by lugs on members 111 supported between chain belts 112. The members 111 may be spaced apart or located in any desired position with reference to the chain belts 112 according to the number of articles which is to be deposited in each container. By this construction a container may be left in filling position for any desired length of time.

The apparatus shown in the drawings is arranged to fill simultaneously six containers, that is, there are six rows of containers 107 being fed through the apparatus when it is being used to its full capacity. Owing to the possibilities in locating the actuating lugs 111 the apparatus may be used for putting for example twenty-five articles in the containers of one row and fifty articles in the containers of another row.

Owing to the fact that, as previously stated, the counting mechanism is across the front of the machine it is desirable to have the chutes 82 connect with other chutes which will have delivery ends at an angle to the chutes 82. For this purpose each of the chutes 82 communicates at its lower end with another chute which will deliver its articles to one of the longitudinal rows of pockets in the conveyor counter. This arrangement is illustrated diagrammatically at 115 in Figs. 2 and 3. The specific construction of the chutes 115 need not be described in detail, the only requirement being that they be so constructed as to provide enough clearance to permit ready flow of the articles to the counting pockets.

As previously stated the hopper mechanism including the movable bottoms to fill and then deliver articles is capable of embodiment, with suitable modifications as to size and operation, to handle articles of almost any desired kind.

It is also apparent that while the apparatus as an entirety has been described in considerable detail, the various parts may be modified and changed and used for many purposes all apparent to those skilled in the art, and it is not the desire to be limited by the drawings or description except to the extent indicated in the claims which follow.

What is claimed is:

1. An apparatus of the character described comprising an article delivery chute, a hopper mechanism comprising a pocket and a movable bottom for the pocket, and an operating mechanism connected to said movable bottom and constructed to lower said bottom quickly to receive a supply of articles in the pocket and then slowly upward to discharge articles from the top of the pocket to the chute.

2. An apparatus of the character described comprising an article delivery chute, a hopper mechanism comprising a pocket and a movable bottom for the pocket, an oscillatory member between the top of the pocket and the top of the chute over which the articles pass from the pocket to the chute, and an operating mechanism connected to said movable bottom and said member constructed to lower said bottom quickly and then slowly raise it while imparting an oscillatory movement to the member.

3. In an apparatus of the character described, a plurality of delivery chutes through which articles are to be delivered, a hopper mechanism comprising a plurality of pockets and bottom members movable down to the bottoms of the pockets to receive articles supplied to the pockets and then upward to discharge articles from the tops of the pockets to the chutes, and a driving mechanism connected to said members and constructed to move said members quickly downward to receive articles and then slowly upward whereby to maintain substantially a continuous discharge of articles from the pockets to the chutes.

4. An apparatus of the character described comprising an article delivery chute, a hopper mechanism comprising a pocket and a movable bottom for the pocket, a roller between the top of the pocket and the top of the chute provided with projections for engaging the articles as they pass from the top of the pocket to the top of the chute, and an operating mechanism connected to said movable bottom and said roller and constructed to lower quickly said bottom to the bottom of the pocket and then raise it slowly to discharge articles from the top of the pocket to the chute while actuating the aforesaid roller.

5. In a machine of the class described, a hopper in which a supply of indiscriminately arranged articles may be deposited, chutes leading from the hopper in which said articles are to be stacked in a predetermined relative arrangement, a plurality of pockets extending downward from the hopper, a member in each of said pockets movable downward to fill said pocket from the supply of articles in the hopper and then upward to discharge said articles from the top of the pockets toward the chutes, and driving mechanism for said members constructed to draw one of said members downward to fill the corresponding pocket while another of said members is being raised to discharge articles from its pocket.

6. In a machine of the class described, a hopper in which a supply of indiscriminately arranged articles may be deposited, chutes leading from the hopper in which said articles are to be stacked in a predetermined relative arrangement, a plurality of pockets extending downward from the hopper, a member in each pocket movable downward to fill said pocket from a supply of articles in the hopper and then upward to discharge said articles from the top of the pocket toward the chutes, and driving mechanism for said members constructed to lower quickly one of said members to fill the corresponding pocket while another of said members is being slowly raised to discharge articles from its pocket.

7. In a machine of the class described, a hopper in which a supply of indiscriminately arranged articles may be deposited, chutes leading from the hopper in which said articles are to be stacked in a predetermined relative arrangement, a plurality of pockets extending downward from the hopper and having their tops inclined downward toward the chutes, a member reciprocable in each of said pockets having a flat top inclined on an angle parallel to the angle of the pocket top, and means for reciprocating said members constructed to draw one member down to fill the associated pocket while another of said members is being raised to discharge articles toward the chutes, the downward strokes of the members being effected at a higher rate of speed than the up strokes.

8. In an apparatus of the character described, a hopper in which a supply of indiscriminately arranged articles may be deposited, chutes leading from the hopper in which said articles are to be stacked in a predetermined relative arrangement, a plurality of pockets extending downward from the hopper, a member in each of said pockets constructed substantially as shown and described movable downward to fill its pocket from the supply of articles in the hopper and then upward to discharge said articles from the top of the pocket toward the chutes, a means including a driven roller between the tops of the pockets and the tops of the chutes for also advancing articles toward the chutes, and driving mechanism constructed to operate the aforesaid members to discharge sequentially and drive said roller.

9. In an apparatus of the character described, a hopper in which a supply of substantially flat tablets may be deposited, chutes leading from the hopper in which the tablets are to be stacked in a predetermined relative arrangement, a plurality of pockets extending downward from the hopper, a member reciprocable in each of said pockets first to fill the pocket from the supply of tablets in the hopper and then discharge the tablets toward the chutes, and means including a roller between the tops of the pockets and the tops of the chutes for advancing tablets toward and into the chutes, and an operating mechanism constructed and connected to reciprocate the aforesaid members sequentially and drive the roller.

10. In an apparatus of the character described, a hopper in which a supply of substantially flat tablets may be deposited, chutes leading from the hopper in which the tablets are to be stacked, a plurality of pockets extending downward from the hopper, a member reciprocable in each of said pockets first to fill the pocket from the supply of tablets in the hopper and then discharge the tablets toward the chutes, means including a helically grooved roller for moving the tablets toward and into the chutes, oscillating devices between the mouths of the chutes and having a substantially flat side for engaging the tablets to prevent bridging of tablets above the chutes, and operating mechanism constructed and connected to reciprocate sequentially the aforesaid members, drive the roller and oscillate the devices for the purposes stated.

11. An apparatus comprising a set of delivery chutes through which substantially flat articles flow by gravity, a hopper mechanism for feeding articles to the tops of the chutes comprising a plurality of pockets, members reciprocable in the pockets to receive articles from a supply above the pockets and then discharge the articles over the tops of the pockets toward the tops of the chutes, an oscillatory roller between the pockets and the chutes carrying projections for engaging the articles and positioning them to pass edgewise toward the chutes, a plurality of oscillatory members each having a flat side and a rounded side cooperating when the members are oscillated to insure delivery of the articles one after another to keep each of the chutes filled, and an operating mechanism for reciprocating the pocket members sequentially, oscillating the roller and oscillating the flat sided members.

12. In an apparatus for delivering tablets to containers, a set of chutes through which the tablets pass to the containers, mechanism for supplying tablets to the chutes comprising a plurality of hoppers each having a bottom which is lowered to fill the hopper from a supply above the hopper and then raised to discharge tablets toward the chutes, devices intermediate the hoppers and the chutes operable to deliver tablets edgewise into the chutes and insure an uninterrupted flow of tablets through the chutes, and an operating mechanism for operating the hopper bottoms and said intermediate devices.

13. In an apparatus for delivering substantially flat tablets to containers, a set of chutes through which tablets pass by gravity to the containers, mechanism for supplying tablets to the chutes comprising a plurality of hoppers each having a bottom which is lowered quickly to fill the associated pocket from a supply above the hoppers while another of said bottoms is being slowly raised to discharge tablets toward the chutes, devices intermediate the hoppers and the chutes operable to turn such tablets as may require it in order to feed all tablets edgewise toward the chutes, oscillatory devices at each side of each chute for agitating the tablets to prevent a bridging of the tablets above the entrances to the chutes, and operating mechanism for operating said hopper bottoms, intermediate devices and oscillatory devices.

14. In an apparatus of the character described, a set of chutes through which tablets are fed by gravity from a source of supply, a pair of members at the entrance to each chute, each of said members being mounted for oscillatory movement and constructed to provide a flat side engaging and moving some of the tablets when the member is oscillated and a rounded portion cooperating with the flat side of the other member of the pair to direct tablets into a chute, and means for oscillating said members.

HERBERT HORNER.